(12) United States Patent
Kapoor et al.

(10) Patent No.: US 9,958,862 B2
(45) Date of Patent: May 1, 2018

(54) INTUITIVE MOTION COORDINATE SYSTEM FOR CONTROLLING AN INDUSTRIAL ROBOT

(71) Applicants: Chetan Kapoor, Austin, TX (US); Ratheesh Rajan, Austin, TX (US)

(72) Inventors: Chetan Kapoor, Austin, TX (US); Ratheesh Rajan, Austin, TX (US)

(73) Assignee: Yaskawa America, Inc., Waukegan, IL (US)

( * ) Notice: Subject to any disclaimer, the term of this patent is extended or adjusted under 35 U.S.C. 154(b) by 0 days. days.

(21) Appl. No.: 14/455,345

(22) Filed: Aug. 8, 2014

(65) Prior Publication Data
US 2015/0321351 A1 Nov. 12, 2015

Related U.S. Application Data

(60) Provisional application No. 61/990,442, filed on May 8, 2014.

(51) Int. Cl.
*G06F 19/00* (2018.01)
*G05B 19/427* (2006.01)
*B25J 9/16* (2006.01)

(52) U.S. Cl.
CPC ............ *G05B 19/427* (2013.01); *B25J 9/161* (2013.01); *G05B 2219/39445* (2013.01);
(Continued)

(58) Field of Classification Search
CPC ............ A61B 1/00004; A61B 1/00013; A61B 1/00045; A61B 1/00057; B25J 9/1656;
(Continued)

(56) References Cited

U.S. PATENT DOCUMENTS 5,301,336 A    4/1994   Kadosky
5,483,440 A    1/1996   Aono
(Continued)

OTHER PUBLICATIONS

Spencer, A, et al., Collision Avoidance Techniques for Tele-Operated and Autonomous Manipulators in Overlapping Workspaces, IEEE International Conference on Robotics and Automation, 2008.
(Continued)

*Primary Examiner* — Ronnie Mancho
(74) *Attorney, Agent, or Firm* — Jeffrey Van Myers; Artie Pennington

(57) ABSTRACT

A method and apparatus for controlling an industrial robot relative to an intuitive motion coordinate system. The current 3D position of a touch-screen teach pendant relative to the robot is sensed, and an operator-centric frame of reference is developed relative to the robot-centric frame of reference. A simulacra of the robot is generated, oriented so as to correspond with an operator view of the robot from the current position of the controller, and displayed on the pendant. A motion-control construction, generated and displayed on the pendant, is adapted to receive jog commands from the operator indicative of a respective incremental movement of the simulacra in the operator-centric frame of reference. Each jog command is transformed from the operator-centric frame of reference to the robot-centric frame of reference, and the robot moved in accordance with the transformed jog command. Movement of the pendant relative to the robot is sensed and, in response, the displayed simulacra is reoriented to correspond to the new position of the pendant relative to the robot as viewed by the operator.

11 Claims, 8 Drawing Sheets

(52) U.S. Cl.
CPC ............ *Y10S 901/06* (2013.01); *Y10S 901/14* (2013.01); *Y10S 901/28* (2013.01); *Y10S 901/30* (2013.01)

(58) Field of Classification Search
CPC .. G05B 19/401; G05B 19/402; G05B 19/423; G05B 2219/36451; G05B 2219/40298
USPC .... 700/264, 229, 253, 259, 245, 98; 901/30, 901/47, 3
See application file for complete search history.

(56) References Cited

U.S. PATENT DOCUMENTS

| | | | | |
|---|---|---|---|---|
| 6,167,328 | A * | 12/2000 | Takaoka et al. | 700/264 |
| 6,944,584 | B1 * | 9/2005 | Tenney et al. | 703/22 |
| 7,002,585 | B1 | 2/2006 | Watanabe | |
| 7,343,222 | B2 | 3/2008 | Solomon | |
| 7,668,292 | B1 | 2/2010 | Bose | |
| 7,746,978 | B2 | 6/2010 | Cheng | |
| 8,112,176 | B2 | 2/2012 | Solomon | |
| 8,175,892 | B2 | 5/2012 | Kapoor | |
| 8,694,296 | B2 | 4/2014 | Kapoor | |
| 2004/0243282 | A1 * | 12/2004 | Watanabe et al. | 700/259 |
| 2005/0251291 | A1 | 11/2005 | Solomon | |
| 2006/0133573 | A1 | 6/2006 | Wong | |
| 2006/0271240 | A1 * | 11/2006 | Nihei et al. | 700/245 |
| 2010/0286797 | A1 | 11/2010 | Liu | |
| 2010/0286824 | A1 | 11/2010 | Solomon | |
| 2011/0288667 | A1 * | 11/2011 | Noda et al. | 700/98 |
| 2012/0123590 | A1 * | 5/2012 | Halsmer | 700/264 |
| 2012/0290130 | A1 | 11/2012 | Kapoor | |
| 2014/0195054 | A1 * | 7/2014 | Kamiya | 700/263 |
| 2014/0288706 | A1 * | 9/2014 | Asahi et al. | 700/250 |
| 2014/0288711 | A1 * | 9/2014 | Sawada et al. | 700/259 |
| 2015/0130794 | A1 * | 5/2015 | Katsuda | 345/419 |
| 2015/0151431 | A1 * | 6/2015 | Suyama et al. | 700/245 |
| 2015/0174767 | A1 * | 6/2015 | Som | 700/245 |

OTHER PUBLICATIONS

Chen, I-Ming, Realization of a Rapidly Reconfigurable Robotic Workcell, Submitted to Journal of Japan Society of Precision Engineering 2000.

Keba AG, KeTop_T10_Datenblatt_E_mail.pdf (downloaded Jul. 22, 2014 from http://www.keba.com/en/industrial-automation/kemobile-mobile-operation/products/ketop-t10-directmove/downloads/).

Keba AG, KeTop_T10_Zusatzbroschuere_E_01.pdf ((downloaded 22 Jul 204 from http://www.keba.com/en/industrial-automation/kemobile-mobile-operation/products/ketop-t10-directmove/downloads/).

Kuka Roboter GmbH, Controllers, www.kuka-robotics.com/en/products/controllers/ (downloaded Jul. 25, 2014).

Kuka Roboter GmbH, Smartpad, www.kuka-robotics.com/en/products/controllers/smartPAD/start.htm (downloaded Jul. 25, 2014).

Universal Robots A/S, PolyScope Manual, Version 3.0 (rev. 15167) (downloaded Aug. 8, 2014).

* cited by examiner

INTUITIVE MOTION COORDINATE SYSTEM FOR CONTROLLING AN INDUSTRIAL ROBOT

CROSS-REFERENCE TO RELATED APPLICATIONS

This application is related to Provisional Application Ser. No. 61/990,442, filed 8 May 2014 ("Parent Provisional"), the subject matter of which, in its entirety, is expressly incorporated herein by reference, and hereby claims benefit of the filing date thereof pursuant to 37 CFR § 1.78(a)(4).

The subject matter of this application is also related to the subject matter of U.S. Pat. No. 8,694,296, Method and apparatus for integrated simulation, issued 8 Apr. 2014 ("Related Patent"), the subject matter of which, in its entirety, is expressly incorporated herein by reference.

BACKGROUND OF THE INVENTION

1. Field of the Invention

The present invention relates generally to industrial robot control systems, and, in particular, to a coordinate system for controlling an industrial robot.

2. Description of the Related Art

In general, in the descriptions that follow, we will italicize the first occurrence of each special term of art which should be familiar to those skilled in the art of robot control systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Robot programming methodologies have not changed much since the dawn of the industrial robot some 40 years ago. The most commonly used technique allows the programming of the robotic task by recording positions of interest, and then developing an application program that moves the robot through these positions of interest based on the application logic. Some improvements have been made in this technique, with primary improvement in a graphical interface to specify application logic. Nevertheless, moving the physical robot to positions of interest is still needed in order to record positions of interest. The following paragraphs describe the commonly used methods for this purpose:

Teach Pendant Based:

As illustrated generally in FIG. 1, the most prevalent method involves moving of the physical robot 100 through an operator interface 102 (commonly referred to a teach pendant in industrial robot terminology) that allows the operator to command motion of each joint axis of the multi-axis robot 100. Various choices are available for the axes of motion based on the coordinate frame selected by the operator. In general, known, prior art operator interfaces include the following coordinate frames, several of which are illustrated in FIG. 1:

Axis (Joint) Coordinate Frame: In the axis or joint coordinate frame 104 illustrated in FIG. 1b, the motion of each joint axis of the robot 100 is controlled with respect to positive and negative directions. This approach may pose a non-trivial challenge to a new operator, since, from the perspective of the operator, it is not always obvious which way is positive or negative with respect to the robot. We submit that it may be more intuitive for an untrained operator to visualize robot movement relative to the operator as requiring either clockwise or counter-clockwise rotation, or, alternatively, as requiring rotation to the left or rotation to the right.

Note: for convenience of reference, we may, from time to time, in the following disclosure, refer to the several coordinate frames of reference simply as frames, e.g., we may refer to the "axis frame" rather than use the full "axis coordinate frame".

Robot Coordinate Frame: In the robot coordinate frame 104b illustrated in FIG. 1a, the robot 100 is installed with the coordinate frame at the origin of the robot aligned with a given world frame 104c (also illustrated in FIG. 1a). Motion of the robot tool (not shown) is controlled by directing it to move along the X, Y, or Z direction relative to a tool center point ("TCP") or to rotate the tool about the X, Y, or Z directions relative to the TCP. The challenge again is that to a new operator the orientation of the X, Y, and Z directions with respect to the TCP are not always obvious.

TCP Coordinate Frame: In the TCP coordinate frame 104d illustrated in FIG. 1a, coordinates are generally determined with respect to the tool mounting plate 106. As is known, the tool mounting plate 106 is the mechanical part of the robot 100 to which an end-effector (such as a gripper) is attached. By selecting motion in the TCP frame, an operator can move the tool of the robot along the X, Y, and Z direction of the TCP frame. Similarly, the operator can also rotate the tool about the X, Y, and Z directions of the TCP frame. Again, the challenge is that the orientation (which way the X, Y, and Z are pointing) of the TCP frame is not always obvious to an operator who is looking at the robot.

User Coordinate Frame: In the user coordinate frame 104e illustrated in FIG. 1a, location coordinates are normally associated with an object in the robot workspace 108. By selecting motion in a given user frame, an operator can move the tool of the robot 100 along the X, Y, and Z direction of the user frame. Similarly, the operator can also rotate the tool about the X, Y, and Z directions of the user frame. Again, the challenge is that the orientation (which way the X, Y, and Z are pointing) of the user frame is not obvious to an operator who is looking at the robot within the workspace.

Offline Teaching:

Offline teaching is a technique, somewhat analogous to the teach pendant method, that uses a virtual robot (comprised of a 3Dimensional ("3D") model or simulacra of the robot and, possibly, the other items in the robot workcell) instead of a physical robot. One such system is disclosed in the Related Patent. Some of these virtual environments have integrated computer-aided design capabilities, and allow the operator to point-and-click on a position of interest, thereby causing the simulacra to move to that point. This feature reduces the manual effort required to jog (or drive) the robot to the intended position in 3D space.

Sensor Driven:

Another known method for programming a robot involves limited teaching of positions, and then using real-time sensor feedback to identify the target position to which the robot needs to move. Usually, this target position is identified using a computer vision system that is programmed, first, to identify the target workpiece, and, then, to return output target position coordinates to which the robot is to move. This reduces the teaching effort, but transfers the effort to the programming and calibration of the vision system. The application logic of how the robot moves to the target position (e.g., the path it takes, the speed at which it moves, etc.) still has to be specified by the application developer.

Lead-Through Teaching:

In general, lead-through teaching requires the operator manually to move the robot through a series of specific positions, typically by grasping its end-effector and moving it through each of the tasks it is supposed to accomplish. Simultaneously, application logic is monitoring the movements and positions, and recording the sequence for later playback during normal operation. As is known, this technique can be used to teach the path the robot has to follow, as well as the several specific positions and tool orientations, and, often, some application logic. However, this technique has not seen wide acceptance due to safety concerns (as the robot has to be powered through this process) and also due to size discrepancy between the human operator and a robot that may be significantly larger than the operator. Notwithstanding, one advantage of this technique is that the operator can not only teach the path, the positions and the orientations, but can also teach the resistive force that the robot needs to apply to the environment when contact is made.

Examples of contemporary robot control systems that implement one or more of the above approaches include the following:

1. ABB (Switzerland).
Flex Pendant, see:
1.1. ABB MultiMove functionality.pdf;
1.2. Datasheet Int PLC ROBO190EN_A;
1.3. IRC5 datasheet PR10258 EN_R13.pdf;
1.4. ROBO236EN_A IRC5_LR.pdf;
1.5. ROBO251EN_A.pdf;
1.6. new.abb.com/products/robotics/controllers/irc5; and
1.7. www05.abb.com/global/scot/scot241.nsf/veritydisplay/b5749ff3daf2a2e7c1257746004ebb1d/$file/Teach%20Pendant.wmv;
1.8. This technology allows the operator to jog the robot using a joystick integrated into the teach pendant, with the angle of displacement of the joystick controlling the speed of movement of the robot. However, the direction of motion of the robot depends only on the direction of movement of the joystick relative to the teach pendent, per se, and this relationship does not change as a function of the position of the pendant+operator relative to the robot, i.e., the relationship between the joystick movements and the robot's jog directions are fixed.

2. gomtec GmbH (Germany).
roboCommander, see:
2.1. www/gomtec.de/gb/lightweight-robotics/components/robocommander.html; and
2.2. www/gomtec.de/gb/lightweight-robotics/videos/teaching/html;
2.3. While this lead-through teaching approach is intuitive to the operator, it is not generally considered safe for the operator physically to be near robots or to manually operate large robots (however, we note that this may be solved using the latest safety technologies and collaborative robot concepts). A second issue is that getting precise movements is usually difficult and cumbersome with this approach.

3. KUKA AG (Austria).
SmartPad, see:
3.1. www.kuka-robotics.com/en/products/controllers;
3.2. www.kuka-robotics.com/en/products/controllers/smartPAD/start.html; and
3.3. www.youtube.com/watch?v=4gDjgomANC4;
3.4. This technology allows jogging the robot using a haptic 6D mouse integrated into the teach pendant; however, the resulting direction of the robot's motion does not appear to be relative to the position of the operator with respect to the robot, i.e., the relationship between the mouse movements and the robot's jog directions are fixed.

LBR iiwa, see:
3.5. www.youtube.com/watch?v=r7gU74Yv9Es.
3.6. Our comments with respect to Example 2, above, are pertinent here as well.

4. KEBA AG (Austria).
KeTop T10 directMove, see:
4.1. KeTop_T10_Datenblatt_E_mail.pdf;
4.2. KeTop_T10_Zusatzbroschuere_E_01.pdf; and
4.3. www.keba.com/en/industrial-automation/kemobile-mobile-operation/products/ketop-t10-directmove;
4.4. This technology integrates into the teach pendant an Inertial Measurement Unit (IMU) to detect in 3D space the orientation of the pendant. In addition, as in Example 1, above, a joystick is provided to allow the operator to initiate jog commands to the robot; however, these references make clear that the movements of the joystick are interpreted by the controller relative to the orientation of the pendant with respect to the downward force of gravity, e.g., the floor of the workcell. Unfortunately, what is NOT made clear in these documents (or any other materials that we have been able to identify) is whether or not the controller factors in (or even has access to data sufficient to determine) the position of the pendant/operator relative to the robot's frame of reference.

5. Robotiq (Canada).
robotCommander, see:
5.1. RoboCommanderRing.pdf; and
5.2. blog.robotiq.com/bid/68640/Teaching-Welding-Robots-by-Demonstration-vs-Teach-Pendant-Programming;
5.3. Our comments with respect to Example, above, are pertinent here as well.

6. Universal Robots A/S (Denmark).
Polyscope, see:
6.1. Software_Manual_en_US.pdf ("Polyscope Manual");
6.2. The Polyscope graphical user interface for Universal Robots' UR5 and UR10 robots employs screens that display a 3D model (i.e., a simulacra) of the robot, and arrows that enable a user to move the robot by pressing the arrows. (See Section 11.1 on page 23 of the Polyscope Manual.) It is also possible for an operator to physically grab the robot arm and pull it to where the operator wants it to be. (See, Section 11.1.5 on page 24 in the Polyscope Manual.) However, even though the Polyscope system displays a 3D model of the robot, the system requires the user to manually reorient the 3D model using controls on the screen so that the viewing angle of the 3D model substantially conforms to the operator's view of the robot. (See Section 11.1.1 in page 23 of the Polyscope Manual.)

N.B.: copies of all of the above references, including the videos, are submitted herewith, and each is expressly incorporated herein by reference.

We submit that what is needed is an improved method for robot programming that encompasses the capabilities of the most prevalent method, i.e., the Teach Pendant Based (see, above), while simplifying this method by using a new set of coordinate frames for commanding the motion of the robot. In particular, we submit this new coordinate frame should be more intuitive to the operator, and substantially reduce the need for the operator to understand geometric coordinate frames and their respective directions. Further, we submit that such a method and apparatus should provide performance generally comparable to the best prior art techniques but more efficiently than known implementations of such prior art techniques.

BRIEF SUMMARY OF THE INVENTION

In one embodiment of our invention, we provide a method for using a computer to control a multi-axis robot having a controller comprising a touch screen adapted to interact with an operator. According to our method, we first generate a simulacra of the robot for display on the touch screen; second, we determine a 3D position of the robot relative to a robot-centric first frame of reference; third, we sense a 3D current position of the controller relative to the first frame of reference; fourth, we develop an operator-centric second frame of reference corresponding to the current position of the controller with respect to the first frame of reference; fifth, we orient the simulacra in the second frame of reference to correspond with an operator view of the robot from the current position of the controller; sixth, we display the oriented simulacra on the touch screen; seventh, we receive from the operator via the touch screen a jog command indicative of a respective incremental movement of the simulacra in the second frame of reference; eighth, we transform the jog command from the second frame of reference to the first frame of reference; and, ninth, we move the robot in the first frame of reference in accordance with the transformed jog command.

In one alternate embodiment of our invention, we provide a method for using a computer to control a multi-axis robot having a controller comprising a touch screen adapted to interact with an operator. According to our method, we first generate a simulacra of the robot for display on the touch screen; second, we determine a 3D position of the robot relative to a robot-centric first frame of reference; third, we sense a current 3D position of the controller relative to the first frame of reference; fourth, we develop an operator-centric second frame of reference corresponding to the current position of the controller with respect to the first frame of reference; fifth, we orient the simulacra in the second frame of reference to correspond with an operator view of the robot from the current position of the controller; sixth, we display the oriented simulacra on the touch screen; seventh, we display on the touch screen a motion-control construct suggestive of a movement of the simulacra; eighth, we receive from the operator via the motion-control construct displayed on the touch screen a jog command indicative of a respective incremental movement of the simulacra in the second frame of reference; ninth, we transform the jog command from the second frame of reference to the first frame of reference; tenth, we move the robot in the first frame of reference in accordance with the transformed jog command; eleventh, we sense a change in the current position of the controller relative to the first frame of reference; twelfth, we translate the second frame of reference to correspond to the current position of the controller with respect to the first frame of reference; and then we return to the fifth step and repeat the following steps.

In yet another embodiment of our invention, we provide a method for using a computer to develop a simulacra of a multi-axis robot for display on a display screen integrated into a controller adapted for use by an operator to control the robot. According to our method, we first generate a simulacra of the robot for display on the display screen; second, we determine a 3D position of the robot relative to a robot-centric first frame of reference; third, we sense a 3D current position of the controller relative to the first frame of reference; fourth, we develop an operator-centric second frame of reference corresponding to the current position of the controller with respect to the first frame of reference; fifth, we orient the simulacra in the second frame of reference to correspond with an operator view of the robot from the current position of the controller; and, finally, we display the oriented simulacra on the display screen.

BRIEF DESCRIPTION OF THE SEVERAL VIEWS OF THE DRAWINGS

Our invention may be more fully understood by a description of certain preferred embodiments in conjunction with the attached drawings in which:

FIG. 1, comprising

FIG. 5, comprising FIG. 6, comprising

Figure 1A:
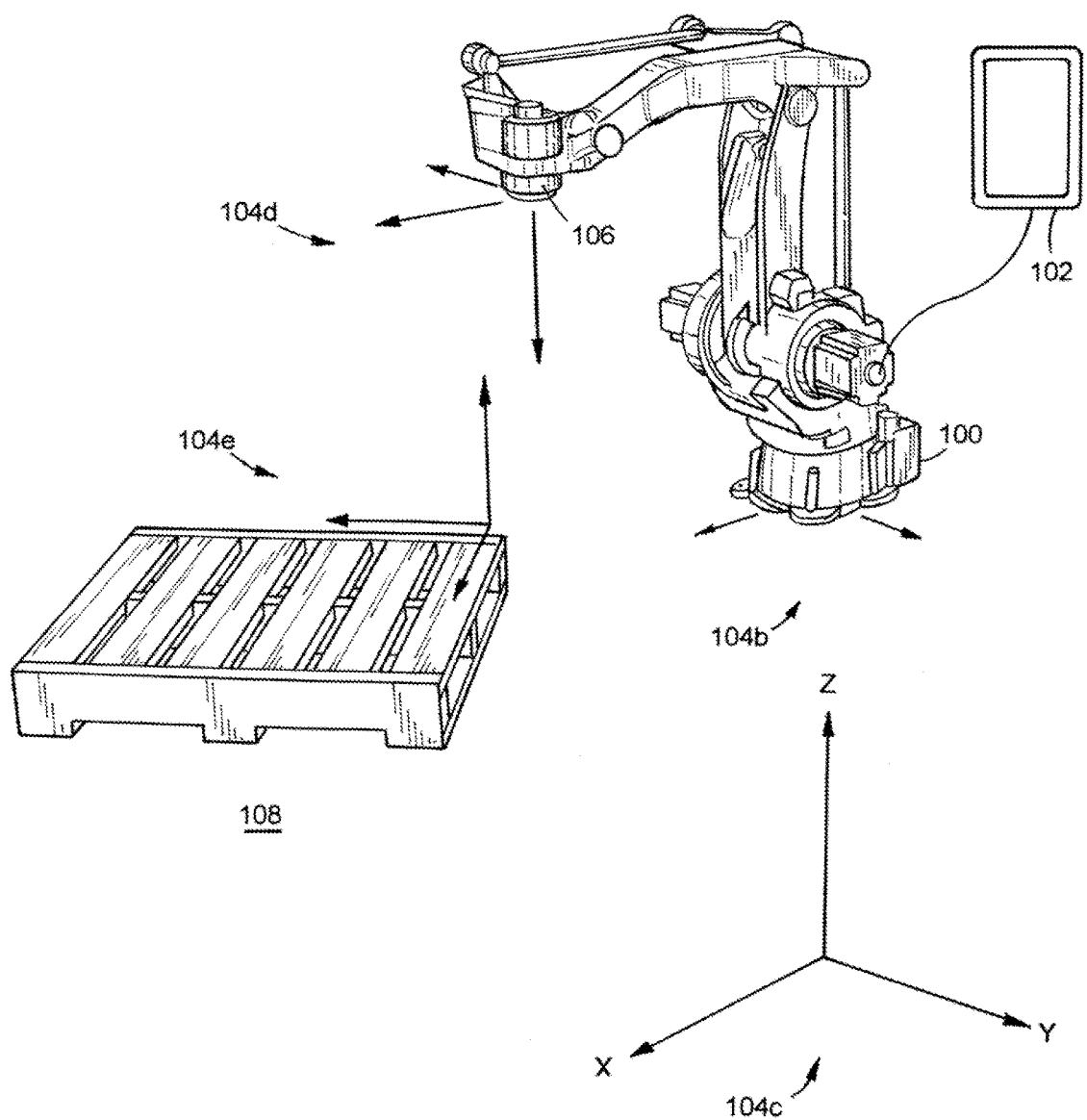
FIG. 1*a* and FIG. 1*b*, illustrates, in pictorial form, a multi-axis robot and 5 known frames of reference for motion of the robot components relative to the several axes.
Figure 1B:
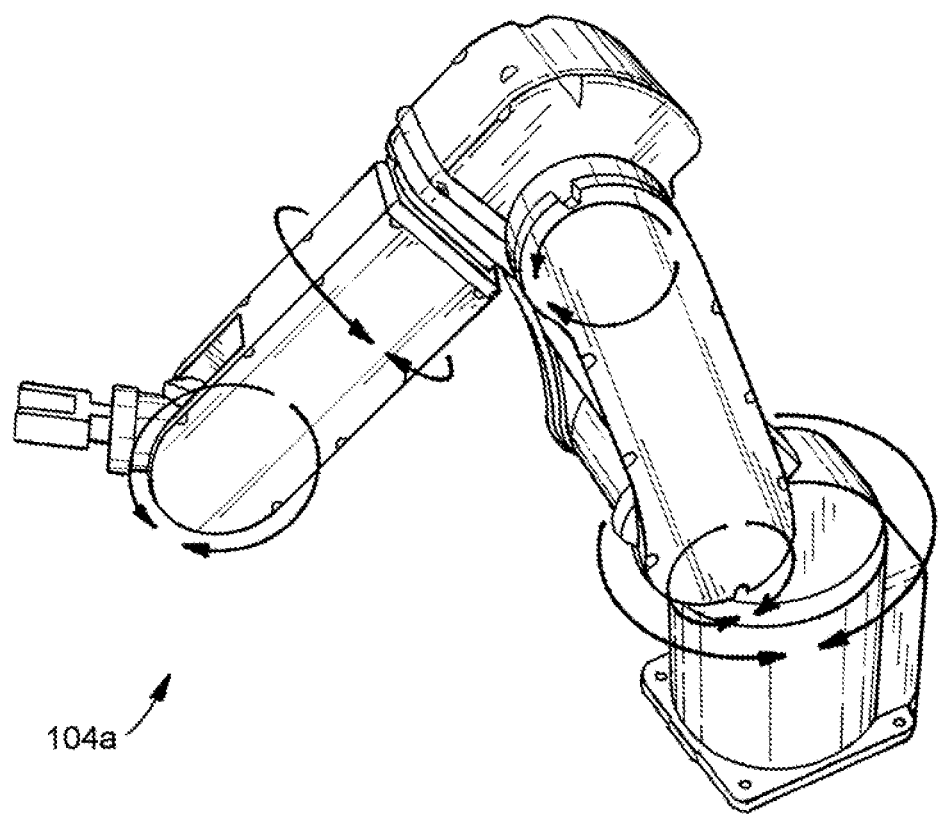

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 3A:
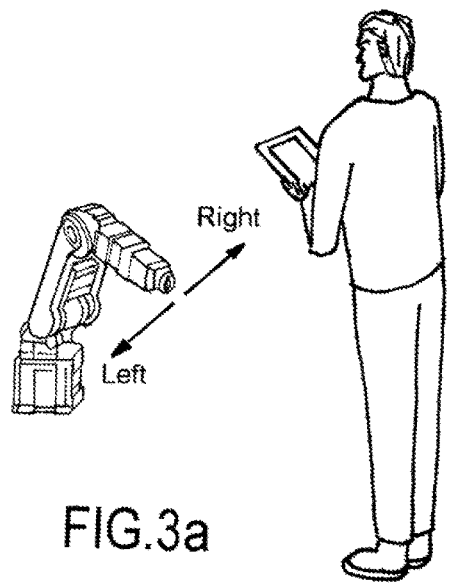
FIG. 3, comprising FIG. 3*a* and FIG. 3*b* illustrates, in pictorial form, our operator frame of reference relative to a robot.
Figure 3B:
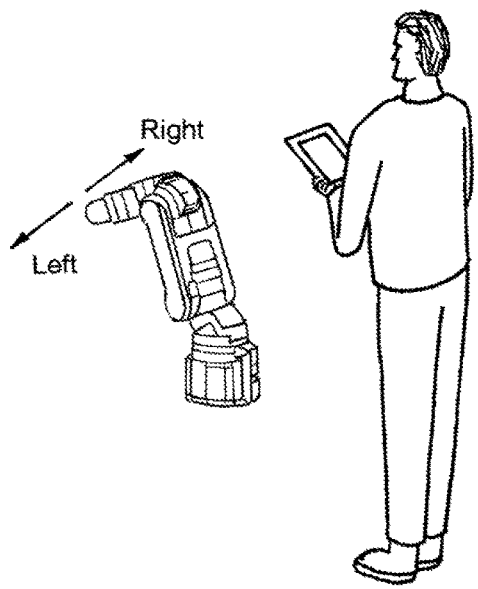

In accordance with our invention, we have developed a new operator coordinate frame of reference adapted to facilitate intuitive control of the relative motions of all axes of a multi-axis robot, as follows:

Operator Coordinate Frame:

In general, our new operator frame defines the direction of motion of the robot tool plate 106 in operator understandable terms, including, e.g., "left", "right", "up", "down", "in" and "out". In accordance with our invention, these directions of motion will always be relative to the operator's current view of the robot, as the operator moves around the robot 100 in its workspace 108. For example, let us assume that the robot is in its home position and that the operator is standing directly in front of the robot, as shown in FIG. 3a. If the operator now commands the robot to move the TCP "left" in the operator frame, the robot will move the TCP in the negative Y direction in the robot frame. Now, let us assume that the robot at its home position but the operator is standing directly behind the robot, as shown in FIG. 3b. In this latter example, the same operator command to move the TCP to the "left" in the operator frame will cause the robot to move the TCP in the positive Y direction in the robot frame. As can be seen, from the perspective of the operator, the human-intuitive direction "left" is automatically transformed in accordance with our invention to the intended respective motion in the robot frame.

Figure 2:
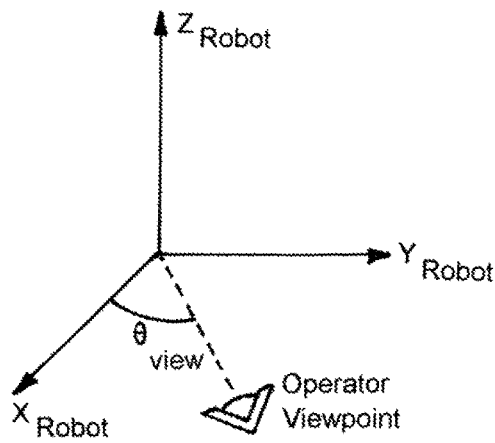
FIG. 2 illustrates, in a 3D pictorial form, the angular components of our operator frame of reference.

Definition of Operator Viewing Angle: As shown generally in FIG. 2, the directions of motion of the TCP in the operator frame are dependent on the viewing angle, θ, at which the operator is viewing the robot, as the operator moves around the robot in its workspace. We define θ to be zero ("0") when the operator is standing in front of the robot on the X-axis line of the robot base frame and looking at the robot. Thus, as the operator moves to either side of the robot, θ represents the angle between the robot's X-axis and the line in the robot's X-Y plane defined by the position of the operator with respect to the origin of the robot frame.

Automatic determination of Operator Viewing Angle: One possible embodiment for determining the viewing angle of the operator frame utilizes a compass sensor mounted on the teach pendant held by the operator. The operator viewing angle at any given location in the workspace is obtained by subtracting the compass heading at the zero view angle location from the current compass heading value, as follows:

$$\theta_{view} = HEADING_{current} - HEADING_{zero} \quad [Eq. 1]$$

Of course, known position orientation means other than a compass sensor could be used. As will be clear to those skilled in this art, the position of the operator and, in particular, the teach pendant relative to the robot frame may be determined using any of several known 3D position location systems, including, e.g., the Global Positioning System ("GPS") or, if higher precision is desired, one of the known Ultra-Wide-Band ("UWB") systems. One such UWB system known to us is commercially available from DecaWave, Ltd. (Dublin, Ireland). Thus, for example, using only one single-chip UWB transceiver (as shown in U.S. Pat. No. 8,437,432, incorporated herein by reference), and at least two independently-operating, fixed UWB base stations, the teach pendant/operator can be precisely located within the workcell using known triangulation techniques. Indeed, we recognize that, in addition to determining the relative position of the teach pendant with respect to the robot frame, the angular orientation of the pendant itself can be determined using a plurality of independently-operating sensors located at respective spaced-apart positions within (or on) the pendant. We will demonstrate hereinafter how such an enhanced position/orientation sensing system can be exploited to great advantage.

Transform Operator Frame to User Frame: As has been noted, our operator frame can be transformed into any of the conventional frame formats. For example, our operator frame can be represented mathematically in terms of the viewing angle, θ, relative to the user frame, as follows:

$$X_{Operator} = [\cos(\theta_{view})\ \sin(\theta_{view})\ 0] \quad [Eq. 2]$$

$$Z_{Operator} = [0\ 0\ 1] \quad [Eq. 3]$$

$$Y_{Operator} = Z_{Operator} \times X_{Operator} \quad [Eq. 4]$$

where: x denotes matrix cross-product, or $$Y_{Operator} = [-\sin(\theta_{view})\ \cos(\theta_{view})\ 0] \quad [Eq. 5]$$

where, $(X_{Operator}, Y_{Operator}, Z_{Operator})$ denotes the user frame representing the current operator frame.

In this example, it should be noted that the origin of this user frame coincides with the origin of the robot frame. Thus, assuming that the robot is mounted on the floor and the operator is walking around on the same plane as the floor, then the 4×4 homogenous transformation matrix for the transformation from the user frame representing the operator frame to the robot frame can be written as:

$$_{Robot}T^{Operator} = \begin{bmatrix} \cos(\theta_{view}) & \sin(\theta_{view}) & 0 & 0 \\ -\sin(\theta_{view}) & \cos(\theta_{view}) & 0 & 0 \\ 0 & 0 & 1 & 0 \\ 0 & 0 & 0 & 1 \end{bmatrix} \quad [Eq. 6]$$

However, our method will still work if the robot is mounted on the wall or inverted, but the math will slightly be different.

Figure 4:
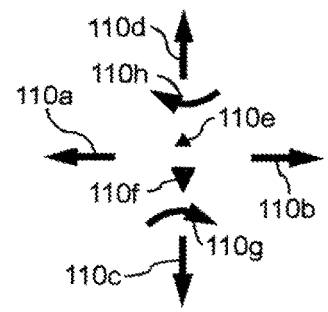
FIG. 4 illustrates, in pictorial form, a teach pendant display format for our operator frame.

Translation of Robot Motion commands in Operator Frame to User Frame: The robot motion commands in operator frame comprise a set of commands that can be easily understood by a human operator. FIG. 4 illustrates one possible format for representing the essential motion commands on the touch panel display of a teach pendant. For basic robot control, operator commands can comprise Jog Left 110a, Jog Right 110b, Jog Up 110c, Jog Down 110d, Jog In 110e and Jog Out 110f. The translation of these commands into motion commands in the user frame representing the operator frame is as follows:

| | |
|---|---|
| Jog Left | Jog in the negative Y Operator direction |
| Jog Right | Jog in the positive Y Operator direction |
| Jog Down | Jog in the negative Z Operator direction |
| Jog Up | Jog in the positive Z Operator direction |
| Jog In | Jog in the negative X Operator direction |
| Jog Out | Jog in the positive X Operator direction |

In FIG. 4, we have illustrated a further pair of operator commands, Rotate Right 110g and Rotate Left 110h to represent rotational movement of the TCP relative to the operator. Of course, additional operator commands are possible, including, e.g., rotational commands of the robot about its base. In operation, the operator can command the robot to perform one of these discrete operations simply by touching the respective symbol on the pendant. In one embodiment, the discrete commands may be issued by the operator in a more continuous fashion by continuing to press the respective symbol until the robot has reached desired location; the repetition rate of the discrete commands can be controlled according to other operator inputs.

Translation of Robot Motion from Operator's User Frame to Robot Frame: The translation of robot motion from the operator's user frame defined in Eq. 6, above, to the robot frame follows the well-established procedure of coordinate frame transformations as follows:

$$\Delta_{robot} = (_{Robot}T^{Operator}) \cdot \Delta_{operator} \quad [\text{Eq. 7}]$$

where:

$\Delta_{robot}$ is the incremental motion in the robot frame expressed as a 4×4 homogenous transform;

$_{Robot}T^{Operator}$ is the 4×4 homogenous transformation matrix representing the operator's user frame;

$\Delta_{operator}$ is the incremental motion in the operator's user frame expressed as a 4×4 homogenous transform; and · represents a matrix multiplication operation.

Figure 5A:
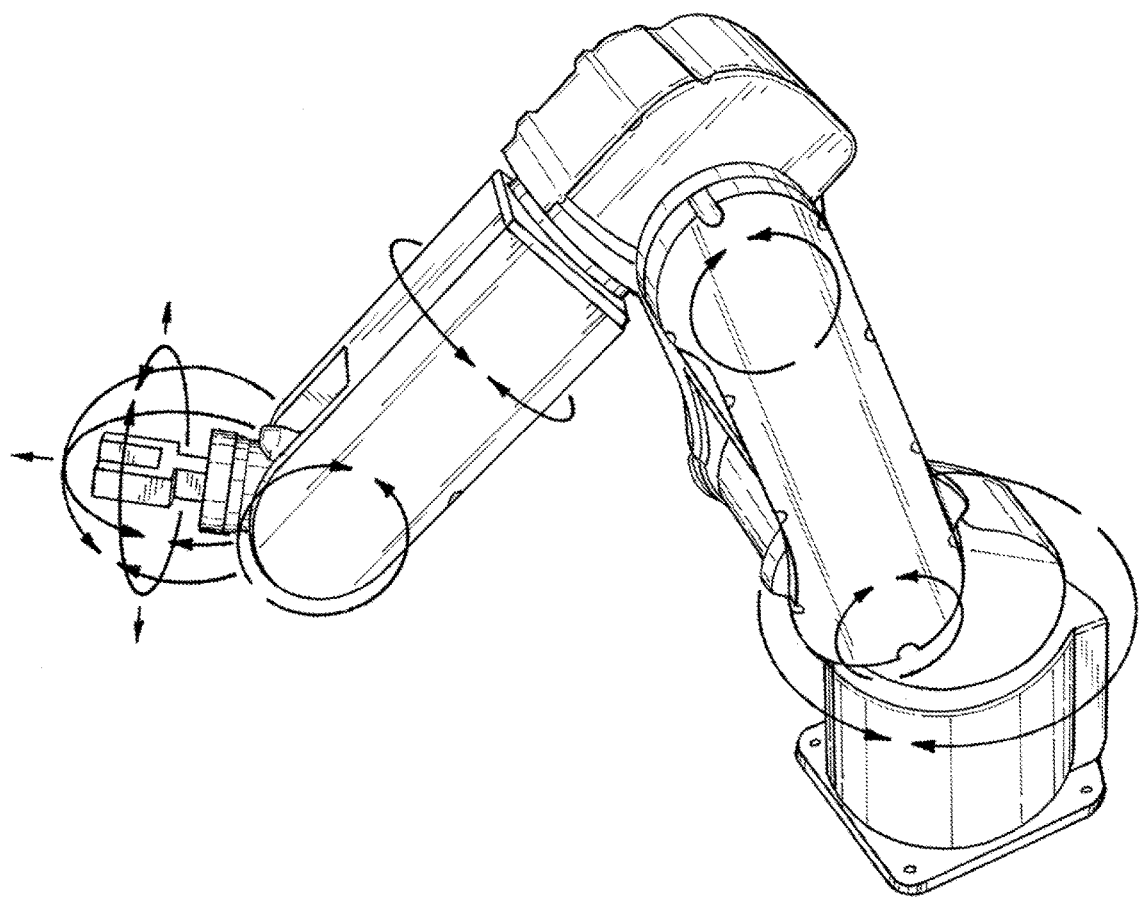
FIG. 5*a* and FIG. 5*b*, illustrates our method using a robot simulator to control motion of a robot.
Figure 5B:
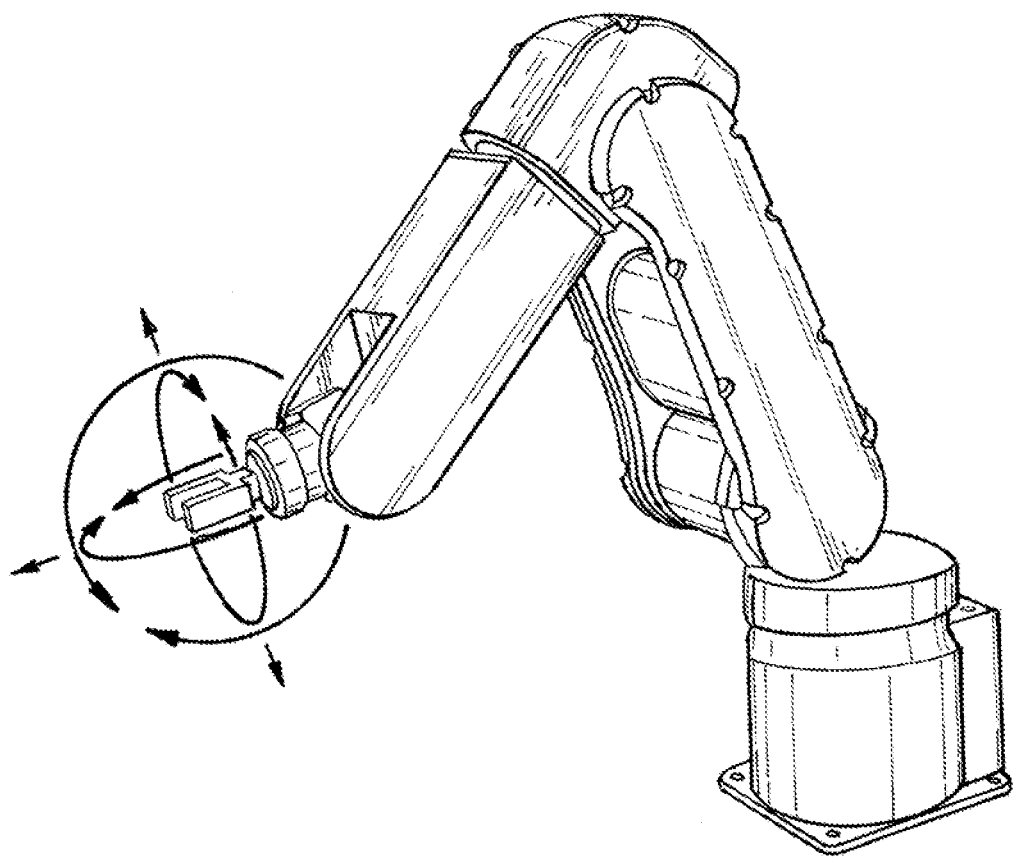
Figure 6A:
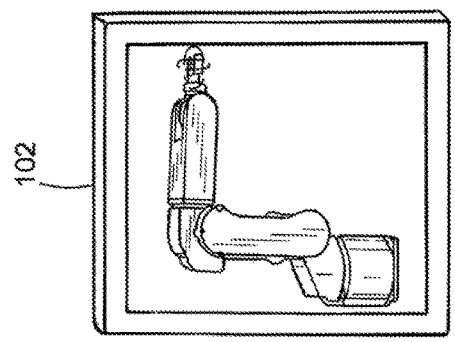
FIG. 6*a*, FIG. 6*b* and FIG. 6*c*, illustrates, in 3D pictorial form, all of the motion axes of the multi-axis robot illustrated in FIG. 5.
Figure 6A:
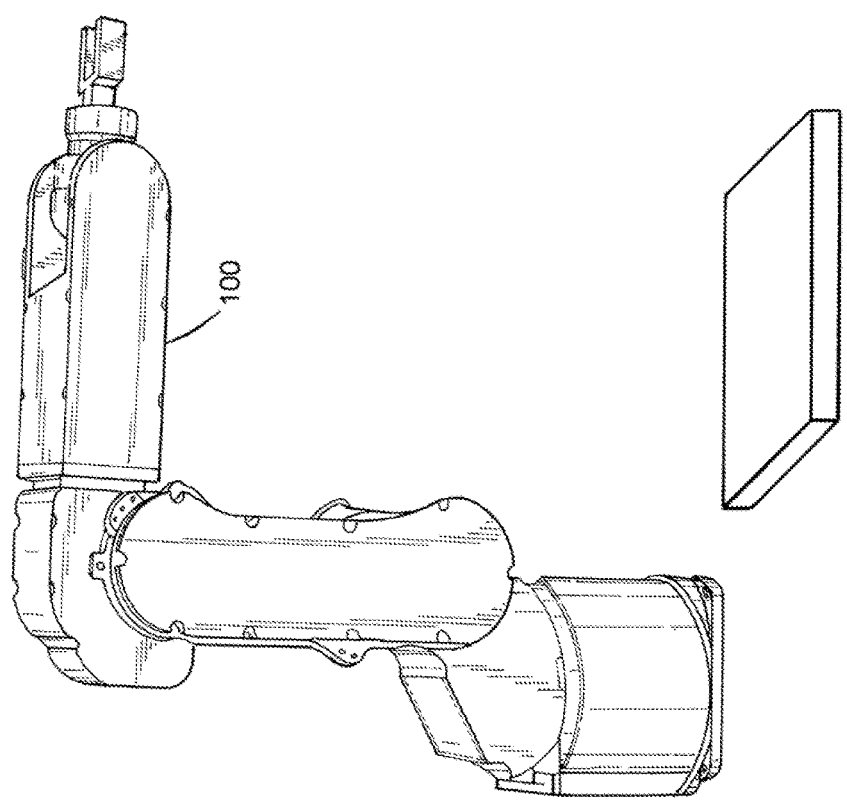
Figure 6B:
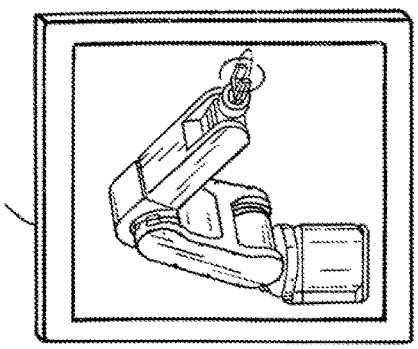
Figure 6B:
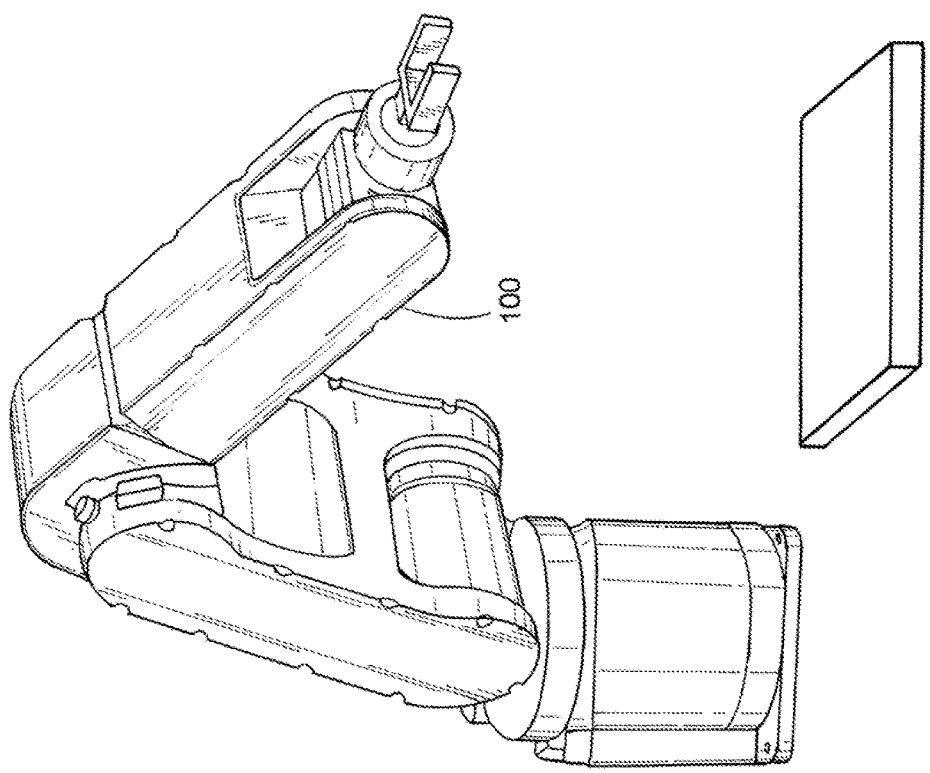
Figure 6C:
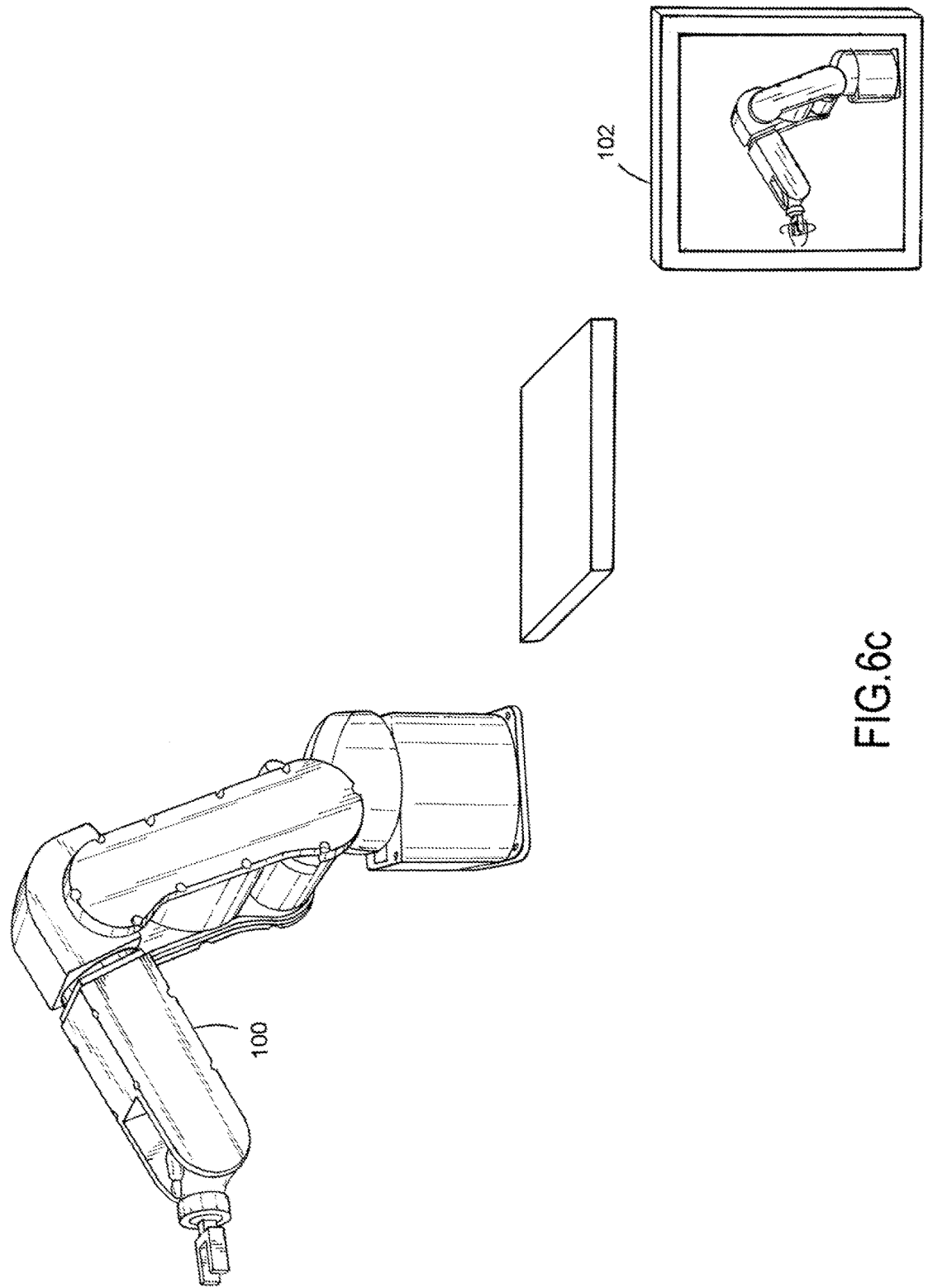

Robot Hand Frame:

Our new robot hand frame is a operator understandable coordinate frame for commanding the motion of the robot's TCP relative to the operator frame using a 3D simulacra of the robot. In this method, a 3D simulacra of the robot is displayed on the teach pendant. In this mode, the operator moves the simulated TCP by touching the anchors in the 3D simulation as shown in FIG. 5 and dragging it in the desired direction of motion for the real TCP. The movement of the simulated TCP commanded by the operator in the 3D simulacra space is captured and automatically transformed into commands to the robot to replicate the move by the real TCP in physical space. Any of several known methods of displaying a 3D simulacra with anchors may be used, e.g., see U.S. Pat. No. 8,694,296, incorporated herein by reference. However, our method on how dynamically to display the 3D simulacra on the pendant to conform to the operator view of the physical robot makes this approach especially effective.

Automatic Orientation of 3D simulacra viewport: As illustrated generally in FIG. 6, our robot hand frame method of commanding the motion of the real robot dynamically reorients the view of the simulated robot displayed on the pendant so as to match the operator's view of the real robot regardless of where the operator is standing relative to the robot 100 in its workspace 108. This makes the directions of motion of the real TCP correlate directly to the directions of motion of the simulated TCP. This automatic reorientation of the 3D simulacra viewport is achieved by utilizing a compass sensor mounted on the pendant. The viewport rotation angle at any given operator location in the workspace is obtained by subtracting the compass heading at the zero view angle location from the current compass heading value. The viewing angle is defined to be zero when the operator is standing in front of the robot on the X-axis line of the robot base frame and looking at the robot. Of course, as noted above, known position orientation means other than a compass sensor could be used.

Robot Axis Frame:

Our new robot axis frame is another operator understandable coordinate frame for commanding the motion of the individual joints of a robot using a 3D simulacra of the robot. In this method, a 3D simulacra of the robot is displayed on the pendant. The operator moves the robot's joints by touching the anchors in the 3D simulation as shown in FIG. 5*a*, and dragging it in the desired direction of motion for the respective joint. The movement of the simulated robot joint commanded by the operator in the 3D simulacra is captured and automatically transformed into commands to the robot to replicate the move by the real joint in physical space.

Automatic Rotation of 3D simulacra viewport: Our robot axis frame method of commanding the motion of robot's joints dynamically rotates the view of the simulated robot displayed on the pendant so as to match the operator's view of the real robot regardless of where the operator is standing relative to the robot 100 in its workspace 108. This makes the directions of motion of the real joints correlate directly to the directions of motion of the simulated joints. This automatic rotation of the 3D simulacra viewport is achieved by utilizing a compass sensor mounted on the pendant. The viewport rotation angle at any given operator location in the workspace is obtained by subtracting the compass heading at the zero view angle location from the current compass heading value. The viewing angle is defined to be zero when the operator is standing in front of the robot on the X-axis line of the robot base frame and looking at the robot. Of course, as noted above, known position orientation means other than a compass sensor could be used.

Although we have described our invention in the context of particular embodiments, one of ordinary skill in this art will readily realize that many modifications may be made in such embodiments to adapt either to specific implementations.

Thus it is apparent that we have provided an improved method and apparatus for robot programming that encompasses the capabilities of the most prevalent method, i.e., the Teach Pendant Based (see, above), while simplifying this method by using a new operator-oriented coordinate frame of reference for commanding the motion of the robot. In particular, we submit our new operator-oriented coordinate frame of reference is more intuitive to the operator, and, thus, substantially reduces the need for the operator to understand geometric coordinate frames and their respective directions. Further, we submit that our method and apparatus provides performance generally comparable to the best prior art techniques but more efficiently than known implementations of such prior art techniques.

What we claim is:

1. A method for controlling a multi-axis robot using an operator interface adapted to interact with an operator, the operator interface comprising a teach pendant having an input element, a display element, and a sensor element adapted to sense a current 3D position of the pendant, the method comprising the steps of:

[1] generating a simulacra of the robot for display on the display element;

[2] determining a current 3D position of the robot relative to a robot-centric first frame of reference;

[3] using the sensor element to sense the current 3D position of the pendant relative to the first frame of reference;

[4] developing an operator-centric second frame of reference corresponding to the current 3D position of the pendant with respect to the first frame of reference;

[5] orienting the simulacra in the second frame of reference to correspond with an operator view of the robot from the current 3D position of the pendant;

[6] displaying the oriented simulacra on the display element;

[7] receiving from the operator via the input element a jog command indicative of a respective incremental movement of the simulacra in the second frame of reference;

[8] transforming the jog command from the second frame of reference to the first frame of reference; and
[9] moving the robot in the first frame of reference in accordance with the transformed jog command.

2. The method of claim 1 further comprising the steps of:
[10] displaying on the display element a motion-control construct representing a movement of the robot;
wherein step [7] is further characterized as:
[7] receiving from the operator via the motion-control construct displayed on the display element a jog command indicative of a respective incremental movement of the simulacra in the second frame of reference.

3. The method of claim 2 further comprising the steps of:
[11] sensing a change in the current 3D position of the pendant relative to the first frame of reference;
[12] translating the second frame of reference to correspond to the current 3D position of the pendant with respect to the first frame of reference; and
[13] returning to step [5].

4. A method for controlling a multi-axis robot using an operator interface adapted to interact with an operator, the operator interface comprising a teach pendant having an input element, a display element, and a sensor element adapted to sense a current 3D position of the pendant, the method comprising the steps of:
[1] generating a simulacra of the robot for display on the display element;
[2] determining a current 3D position of the robot relative to a robot-centric first frame of reference;
[3] using the sensor element to sense the current 3D position of the pendant relative to the first frame of reference;
[4] developing an operator-centric second frame of reference corresponding to the current 3D position of the pendant with respect to the first frame of reference;
[5] orienting the simulacra in the second frame of reference to correspond with an operator view of the robot from the current 3D position of the pendant;
[6] displaying the oriented simulacra on the display element;
[7] displaying on the display element a motion-control construct suggestive of a movement of the simulacra;
[8] receiving from the operator via the motion-control construct displayed on the display element a jog command indicative of a respective incremental movement of the simulacra in the second frame of reference;
[9] transforming the jog command from the second frame of reference to the first frame of reference; and
[10] moving the robot in the first frame of reference in accordance with the transformed jog command;
[11] sensing a change in the current 3D position of the pendant relative to the first frame of reference;
[12] translating the second frame of reference to correspond to the current 3D position of the pendant with respect to the first frame of reference; and
[13] returning to step [5].

5. A computer-implemented method for controlling a multi-axis robot using an operator interface adapted to interact with an operator, the operator interface comprising a teach pendant having an input element, a display element, and a sensor element adapted to sense a current 3D position of the pendant, the method comprising the steps of:
[1] determining a current 3D position of the robot relative to a robot-centric first frame of reference;
[2] using the sensor element to sense the current 3D position of the pendant relative to the first frame of reference;
[3] developing an operator-centric second frame of reference corresponding to the current 3D position of the pendant with respect to the first frame of reference;
[4] displaying on the display element a motion-control construct suggestive of a movement of the robot;
[5] receiving from the operator via the motion-control construct a jog command indicative of a respective incremental movement of the robot in the second frame of reference;
[6] transforming the jog command from the second frame of reference to the first frame of reference; and
[7] moving the robot in the first frame of reference in accordance with the transformed jog command.

6. The method of claim 5 further comprising the steps of:
[4.1] generating a simulacra of the robot for display on the display element;
[4.2] orienting the simulacra in the second frame of reference to correspond with an operator view of the robot from the current 3D position of the pendant; and
[4.3] displaying the oriented simulacra on the display element in association with the displayed motion-control construct.

7. The method of claim 6 further comprising the steps of:
[8] sensing a change in the current 3D position of the pendant relative to the first frame of reference;
[9] translating the second frame of reference to correspond to the current 3D position of the pendant with respect to the first frame of reference; and
[10] returning to step [4].

8. A method for using a computer to develop a simulacra of a multi-axis robot for display on a display screen integrated into a teach pendant adapted for use by an operator to control the robot, the method comprising the steps of:
[1] generating a simulacra of the robot for display on the display screen;
[2] determining a current 3D position of the robot relative to a robot-centric first frame of reference;
[3] sensing a current 3D position of the pendant relative to the first frame of reference;
[4] developing an operator-centric second frame of reference corresponding to the current 3D position of the pendant with respect to the first frame of reference;
[5] orienting the simulacra in the second frame of reference to correspond with an operator view of the robot from the current 3D position of the pendant; and
[6] displaying the oriented simulacra on the display screen.

9. The method of claim 8 further comprising the steps of:
[7] sensing a change in the current 3D position of the pendant relative to the first frame of reference;
[8] translating the second frame of reference to correspond to the current 3D position of the pendant with respect to the first frame of reference; and
[9] returning to step [5].

10. Apparatus configured to perform the method according to any preceding claim.

11. A computer readable medium including executable instructions which, when executed by a computer, cause the computer to perform a method according to any one of claims 1 to 9.

* * * * *